United States Patent
Wu et al.

(10) Patent No.: US 8,994,310 B2
(45) Date of Patent: Mar. 31, 2015

(54) MOTOR CONTROLLER HAVING MULTI-FUNCTIONAL PIN AND CONTROL METHOD THEREOF

(71) Applicants: Yu-Kuang Wu, Zhubei (TW); Wei-Hsu Chang, New Taipei (TW)

(72) Inventors: Yu-Kuang Wu, Zhubei (TW); Wei-Hsu Chang, New Taipei (TW)

(73) Assignee: Richtek Technology Corporation, Zhubei, Hsin Chu ( * ) Notice: Subject to any disclaimer, the term of this patent is extended or adjusted under 35 U.S.C. 154(b) by 122 days.

(21) Appl. No.: 13/847,440

(22) Filed: Mar. 19, 2013

(65) Prior Publication Data
US 2014/0203749 A1    Jul. 24, 2014

(30) Foreign Application Priority Data
Jan. 21, 2013 (TW) .............................. 102102145 A

(51) Int. Cl.
*H02P 1/00* (2006.01)
*H02P 3/00* (2006.01)
*G05B 19/00* (2006.01)

(52) U.S. Cl.
CPC ....................................... *G05B 19/00* (2013.01)
USPC .. 318/490; 318/599; 318/400.19; 318/400.29

(58) Field of Classification Search
USPC ........................ 318/490, 599, 400.19, 400.29
See application file for complete search history.

(56) References Cited

U.S. PATENT DOCUMENTS

| | | | |
|---|---|---|---|
| 4,996,909 A * | 3/1991 | Vache et al. | 454/184 |
| 6,757,832 B1 * | 6/2004 | Silverbrook et al. | 713/194 |
| 7,091,740 B2 * | 8/2006 | Simons | 326/8 |
| 7,141,950 B1 * | 11/2006 | Verge | 318/400.29 |
| 7,327,114 B2 * | 2/2008 | Verge | 318/599 |
| 8,796,966 B2 * | 8/2014 | Peto | 318/400.19 |
| 2002/0171386 A1 * | 11/2002 | Kelly et al. | 318/599 |
| 2005/0055132 A1 * | 3/2005 | Matsumoto et al. | 700/245 |
| 2005/0201408 A1 * | 9/2005 | Otani et al. | 370/438 |
| 2006/0022707 A1 * | 2/2006 | Simons | 326/59 |
| 2006/0023543 A1 * | 2/2006 | Simons | 365/222 |
| 2007/0200518 A1 * | 8/2007 | Verge | 318/268 |
| 2012/0086382 A1 * | 4/2012 | Peto | 318/729 |

FOREIGN PATENT DOCUMENTS

WO      WO 99/22289 A1      10/1998
WO      WO 00/54282 A1       3/2000

* cited by examiner

*Primary Examiner* — Paul Ip
(74) *Attorney, Agent, or Firm* — Tung & Associates

(57) ABSTRACT

The present invention provides a motor controller having one or more multi-functional pins. The motor controller includes a plurality of pins but does not include a dedicated pin for transmitting a clock signal and a dedicated pin for transmitting a motor specification database setting signal, wherein the clock signal and the motor specification database setting signal are for setting motor specification data. The clock signal and the motor specification database setting signal are transmitted through two of the plural pins which are multi-functional function pins shared by other functions in a normal operation mode. In a motor specification database setting mode, these multi-functional function pins are used for transmitting the clock signal and the motor specification database setting signal. In the normal operation mode, these multi-functional function pins are used for other functions.

10 Claims, 4 Drawing Sheets

MOTOR CONTROLLER HAVING MULTI-FUNCTIONAL PIN AND CONTROL METHOD THEREOF

CROSS REFERENCE

The present invention claims priority to TW 102102145, filed on Jan. 21, 2013.

BACKGROUND OF THE INVENTION

1. Field of Invention

The present invention relates to a motor controller, in particular a motor controller having a multi-functional pin so that the number of pins is effectively reduced.

2. Description of Related Art

Typical communication interfaces for motor controller include I2C, SPI, SMBUS, etc., which need at least two communication lines: one for data transmission, and another for clock signal. FIG. 1 shows a prior art motor controller 10, and the motor controller 10 includes a control unit 11, a motor driving unit 12, and a speed transformation unit 13. The motor controller 10 further includes plural pins, wherein the control unit 11 is coupled to the pins H+, H−, and FG. The pins H+ and H− are coupled to a Hall sensor for receiving motor speed sensing signals, and the pin FG is for outputting motor speed information to an external device such as a CPU for judging the motor operation status. The motor driving unit 12 is coupled to pins VM, OUT1, OUT2, and GND, etc. for driving a motor, wherein the pin VM is for connecting to a motor voltage supply, the pin GND is a grounding pin, and the pins OUT1, OUT2 are motor driving pins for outputting motor driving signals; the number of pins may be different if the driving phase number of the motor is different, which can be modified according to practical need. The speed transformation unit 13 includes a memory 131 and is coupled to plural pins SDA, SCK, PWMIN. The pin SDA is for receiving data, the pin SCK is for receiving a clock signal, and the pin PWMIN is for receiving a pulse width modulation signal for speed control. The speed transformation unit 13 generates an output signal according to these signals, and sends the output signal to the control unit 11 for motor operation control.

When the aforementioned prior art motor controller is integrated in a single IC, the pin number directly affects the package cost and it is highly desired to reduce the pin number. In view of this requirement, the present invention provides a motor controller having a multi-functional pin to effectively reduce the pin number.

Taiwan patents No. 498163 (WO 2000/054282A1), No. 490670 (WO 1999/022289A1), No. 490670(WO 2000/054282A1), and No. I305647 (US 2006/0022707A1) disclose motor controllers but none of them provide the benefits of the present invention.

SUMMARY OF THE INVENTION

The present invention provides a motor controller having a multi-functional pin and a control method thereof.

In one aspect, the present invention provides a motor controller comprising a plurality of pins but not including a dedicated pin for transmitting a clock signal in a motor specification database setting mode and not including a dedicated pin for transmitting a motor specification database setting signal in the motor specification database setting mode, the clock signal and the motor specification database setting signal being used for setting motor specification data in the motor specification database setting mode, wherein two of the pins are multi-functional pins for transmitting the clock signal and the motor specification database setting signal in the motor specification database setting mode, and the multi-functional pins are for transmitting other signals in a normal operation mode.

In one preferable embodiment, the plurality of pins include a pin for receiving a speed control signal, pins for receiving motor speed sensing signals, a pin for outputting motor speed information, a pin for connecting to a motor voltage supply, a pin for connecting to ground, and pins for outputting motor driving signals, in the normal operation mode.

In another aspect, the present invention provides a motor controller having a normal operation mode and a motor specification database setting mode, the motor controller comprising: a speed transformation unit, including a memory for storing motor specification data, the speed transformation unit receiving a speed control signal through a speed control signal input pin in the normal operation mode, and generating a motor speed command signal according to the motor specification data; a control unit, receiving the motor speed command signal and receiving a motor speed sensing signal through a motor speed sensing pin in the normal operation mode, and generating a motor speed control signal according to the motor speed command signal and the motor speed sensing signal, the control unit outputting motor speed information through a motor speed information output pin; and a motor driving unit, generating a motor driving signal according to the motor speed control signal to drive a motor through motor driving pins in the normal operation mode; wherein at least one of the speed control signal input pin, the motor speed sensing pin, the motor speed information output pin, and the motor driving pins is used for transmitting a clock signal or transmitting a motor specification database setting signal in the motor specification database setting mode.

In a preferable embodiment of the present invention, at least two of the speed control signal input pin, the motor speed sensing pin, the motor speed information output pin, and the motor driving pins are used for transmitting the clock signal and transmitting the motor specification database setting signal respectively, in motor specification database setting mode.

In a preferable embodiment of the present invention, the motor controller further comprises a pin for connecting to a motor voltage supply and a grounding pin for connecting to a ground.

In another aspect, the present invention provides a method of controlling a motor controller, comprising: entering a motor specification database setting mode, and transmitting a clock signal through a first pin of the motor controller and a motor specification database setting signal through a second pin of the motor controller, for storing a motor specification data in a memory of the motor controller; and entering a normal operation mode, and transmitting a signal which is neither the clock signal nor the motor specification database setting signal through one of the first pin and the second pin of the motor controller.

In a preferable embodiment of the present invention, after entering the normal operation mode, the first pin and the second pin of the motor controller are both used to transmit signals which are neither the clock signal nor the motor specification database setting signal.

In a preferable embodiment of the present invention, the motor controller includes a speed control signal input pin, a plurality of motor speed sensing pins, a motor speed information output pin, a plurality of motor driving pins, a pin for connecting to a motor voltage supply, and a grounding pin for connecting to a ground, and two of these pins are the first pin and the second pin, respectively.

In a preferable embodiment of the present invention, the method further comprises: inputting a first predefined signal to activate the motor specification database setting mode through one of the speed control signal input pin, the motor speed sensing pins, the motor speed information output pin, the motor driving pins, the pin for connecting to a motor voltage supply, and the grounding pin.

In a preferable embodiment of the present invention, the method further comprises: inputting a second predefined signal through one of the speed control signal input pin, the motor speed sensing pins, the motor speed information output pin, the motor driving pins, the pin for connecting to a motor voltage supply, and the grounding pin, or counting a predetermined period of time, to leave the motor specification database setting mode and enter the normal operation mode.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustrative purpose only, but not drawn according to actual scale. The orientation wordings in the description such as: above, under, left, or right are for reference with respect to the drawings, but not for limiting the actual product made according to the present invention.

Figure 1:
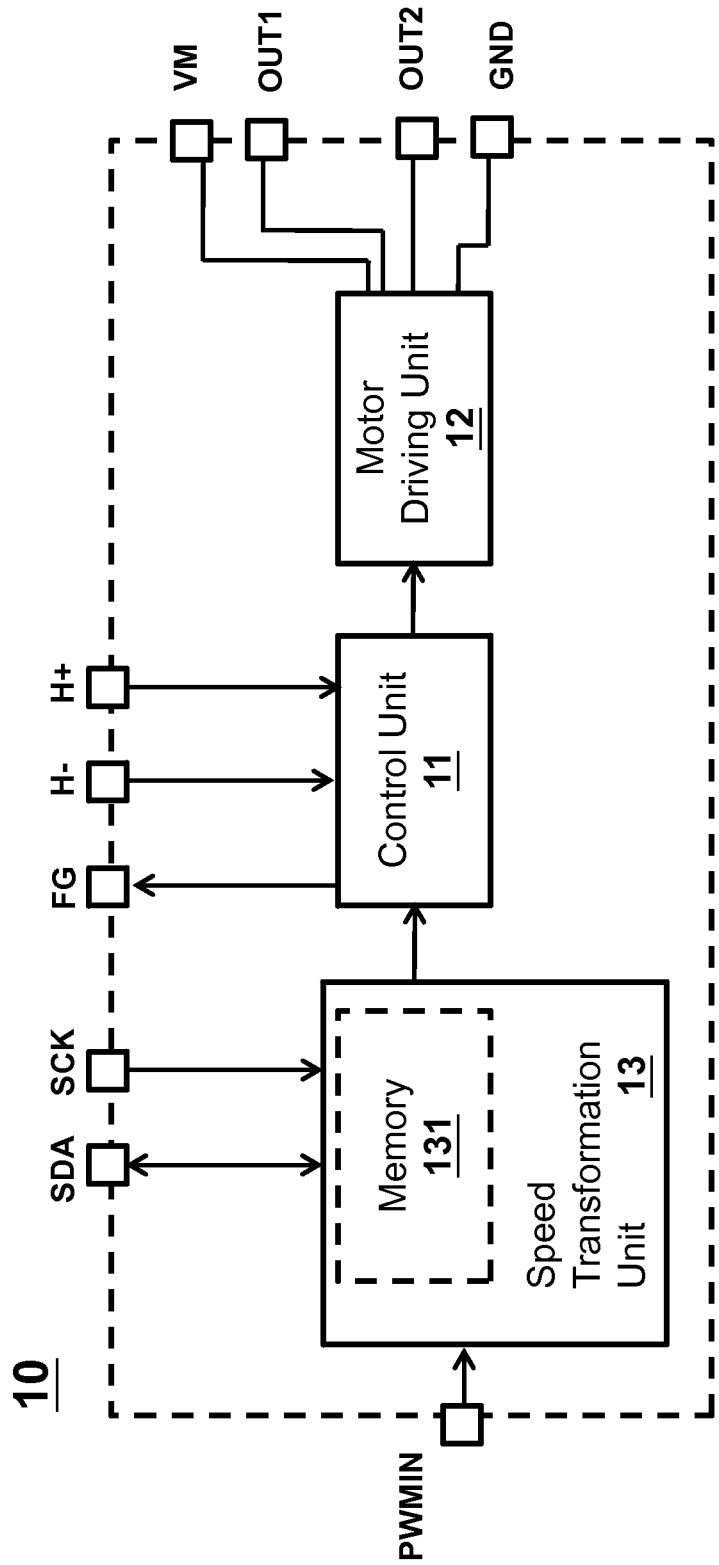
FIG. 1 shows a prior art of the motor controller.
Figure 2:
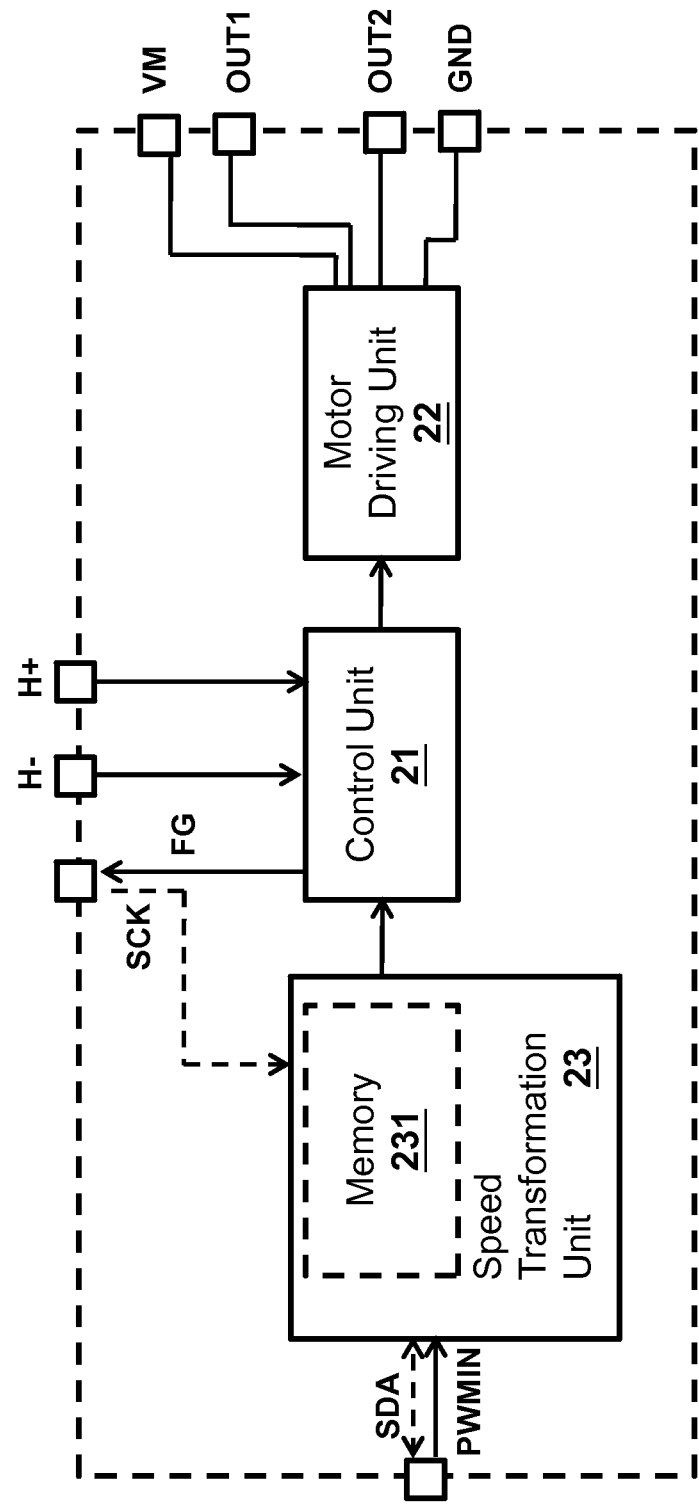
FIG. 2 shows a preferable embodiment of the motor controller according to the present invention.
Figure 3:
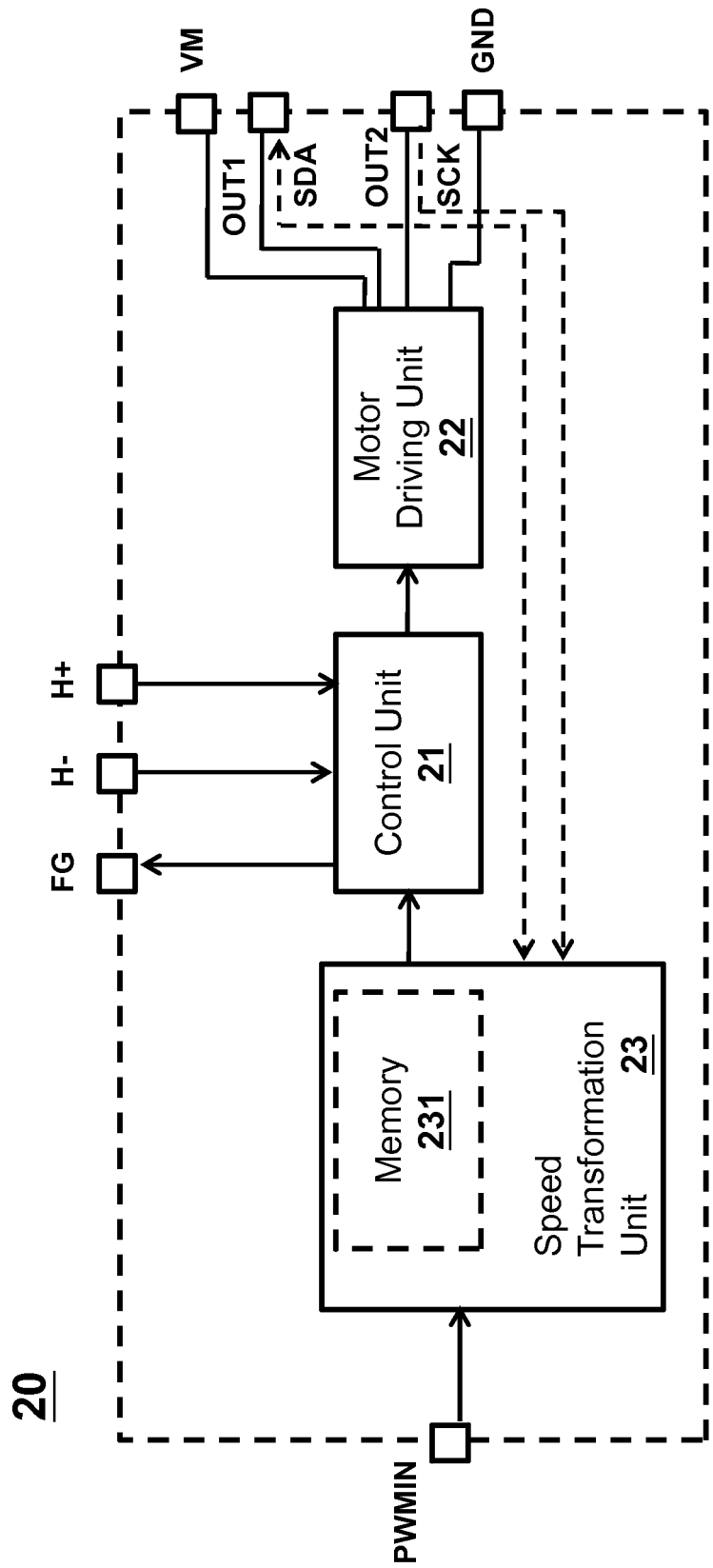
FIG. 3 shows another preferable embodiment of the motor controller according to the present invention.

FIGS. 2 and 3 show an embodiment of the motor controller 20 according to the present invention, which includes a control unit 21, a motor driving unit 22, and a speed transformation unit 23. The speed transformation unit 23 includes a memory 231 for storing motor specification data. The motor controller 20 includes plural pins such as PWMIN, H+, H−, FG, VM, OUT1, OUT2, and GND. The functions of these pins are described in the section "description of related art".

In one aspect, the present invention is different from the prior art in that: the present invention does not need a dedicated pin SCK for transmitting a clock signal and a dedicated pin SDA for transmitting a motor specification database setting signal (The term "motor specification database" is used to distinguish it from the data transmitted through other pins such as PWMIN, H+, H−, FG, etc., although the signals transmitted through these pins are also data signals). The pins SDA and SCK are for setting the motor specification data in a memory 231 before a motor (not shown in figure) is driven to rotate, so these pins SDA and SCK need to operate only in a motor specification database setting mode wherein a motor specification database or certain parameters thereof are set or inputted into the memory 231. In a normal operation mode when the motor is driven to rotate, the pins SCK and SDA are not required to transmit signals, so basically, except the pins for connecting to the power supply and the ground of the motor controller 20, all other pins can be shared as multi-functional pins to serve the functions as the pins SDA and SCK. That is, if the power supply of the motor controller 20 is not from the pin VM and the motor controller 20 is not grounded through the pin GND, any one of the pins PWMIN, H+, H−, FG, VM, OUT1, OUT2 and GND can be used as a multi-functional pin for its own function and the function of one of the pins SDA and SCK. If the power supply of the motor controller 20 is from the pin VM and the motor controller 20 is grounded through the pin GND, then any one of the pins PWMIN, H+, H−, FG, OUT1, and OUT2 can be used as a multi-functional pin for its own function and the function of one of the pins SDA and SCK. Two examples are shown respectively by the embodiment of FIG. 2, wherein the pins PWMIN and FG are used as the multi-functional pins, and by the embodiment of FIG. 3, wherein the pins OUT1, OUT2 are used as the multi-functional pins. These two embodiments are only two possible arrangements to illustrate the concept of the present invention. In fact, any two of the pins can be used as the multi-functional pins as explained in the above.

Referring to FIG. 2, in the normal operation mode, the pins FG and PWMIN are required to transmit signals, while in the motor specification database setting mode, the pins SCK and SDA are required to transmit signals but the pins FG and PWMIN are not required to transmit signals. In this embodiment, the pins FG and PWMIN and the pins SCK and SDA can share the same pins (i.e., the multi-functional pins) and operate in different modes. For example, the pin FG is used to transmit the clock signal and the pin PWMIN used to transmit the motor specification database setting signal in the motor specification database setting mode. Of course, it can be arranged alternatively for the pin PWMIN to transmit the clock signal and the pin FG to transmit the motor specification database setting signal in the motor specification database setting mode.

The memory 231 of the speed transformation unit 23 can store the motor specification data according to the clock signal and the motor specification database setting signal. For example, in one embodiment, various default motor specification data have been stored in the memory 231 in advance, and the motor specification database setting signal can be used to decide which default motor specification data is used; or in another embodiment, the motor specification data is written into the memory 231 according to the transmitted clock signal and the motor specification database setting signal. The motor specification data define the characteristics of the motor specification data so that the motor controller 20 can control the motor accordingly. For example, the motor controller 20 can receive a speed control signal in the format of a pulse width modulation by the pin PWMIN, and the speed transformation unit 23 transforms the speed control signal to a digital number. By referring to the motor specification data, the speed transformation unit 23 can generate a motor speed command signal, and the motor speed command signal is transmitted to the control unit 21. Based on the motor speed command signal and the motor speed sensing signals H+, H− (the motor speed sensing signals H+, H− can be obtained from, for example but not limited to a Hall sensor, or an optical speed sensor), the control unit 21 obtains the information of the target speed and the current speed, and can therefore generate the motor speed control signal to control the motor through the motor driving unit 22.

Figure 4:
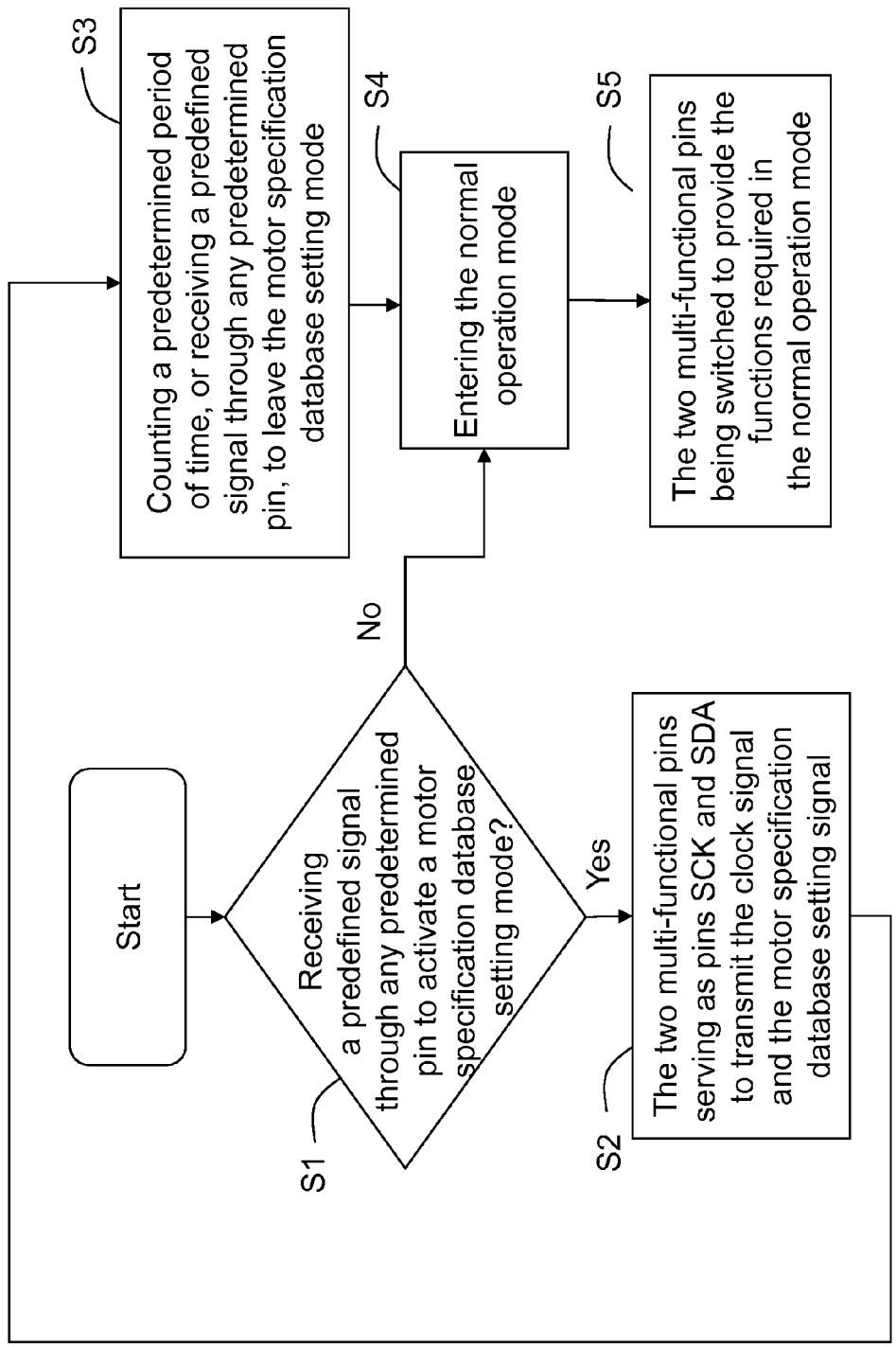
FIG. 4 shows an operation process of the motor controller according to the present invention.

FIG. 4 shows a process embodiment, explaining how the motor controller 20 switches between the motor specification database setting mode and the normal operation mode. After starting up the motor controller, a predefined signal is inputted through any predetermined pin to activate the motor specification database setting mode (step S1), which is preferably done within a predetermined period of time from starting up the motor controller; the predefined signal for example can be pulling down the voltage level at the pin FG to a low level in the embodiment of FIG. 2, or, the predefined signal can be an identifiable predefined signal inputted through any pin, such as but not limited to a high-low switching signal which switches once or multiple times, etc. If such predefined signal is not received, for example within the predetermined period of time, the motor controller can enter the normal operation mode (i.e., skipping the steps S2-S3). In this embodiment, when the control unit 21 identifies the predefined signal, such as detecting a low level at the pin FG, the two multi-functional pins are decided to serve as the pins SCK and SDA to transmit the clock signal and the motor specification database setting signal (step S2). In the step S3, the control unit 21 judges whether the database setting is completed and it is the right timing to leave the motor specification database setting mode, by whatever means that are suitable. For example, the control unit 21 can determine to leave the motor specification database setting mode and enter the normal operation mode (step S4) after counting a predetermined period of time, or after a predefined signal is received through any predetermined pin; the predefined signal for example can be pulling the voltage level of the pin FG to high level for a period of time, or a high-low switching signal which switches once or multiple times, etc. When the predefined signal is identified, the motor specification database setting mode ends and the motor controller 20 enters the normal operation mode (step S4). After entering the normal operation mode, the multi-functional pins are switched to provide the functions required in the normal operation mode, which are the pins FG and PWMIN in the embodiment of FIG. 2.

FIG. 3 shows another embodiment of the motor controller 20 according to the present invention, wherein the pins OUT1 and OUT2 are used as the multi-functional pins that are shared by the functions of the pins SDA and SCK. This embodiment operates in the same way as the process described with reference to FIG. 4.

The memory 231 for example can be, but not limited to: one time programmable read-only memory, multi-time programmable read-only memory, erasable programmable read-only memory, or flash memory.

The motor controller for example can be, but not limited to, a stepping motor controller.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the multi-functional pins are not limited to being shared for transmitting the clock signal and the motor specification database setting signal; they can serve as pins for transmitting any other signals which are not transmitted in the normal operation mode, such as for transmitting a command signal to initialize the motor parameters, for transmitting a test signal, etc., to reduce the pin number. And it is not necessary for the motor controller 20 to include two multi-functional pins for both functions of transmitting the clock signal and the motor specification database setting signal (SCK and SDA); there can be only one multi-functional pin for transmitting one of the clock signal and the motor specification database setting signal, and the other is transmitted by a dedicated pin. A circuit or device which does not affect the primary function can be inserted between two units shown to be in direct connection in the figures. An embodiment or a claim of the present invention does not need to attain or include all the objectives, advantages or features described in the above. The abstract and the title are provided for assisting searches and not to be read as limitations to the scope of the present invention.

What is claimed is:

1. A motor controller, comprising a plurality of pins but not including a dedicated pin for transmitting a clock signal in a motor specification database setting mode and not including a dedicated pin for transmitting a motor specification database setting signal in the motor specification database setting mode, the clock signal and the motor specification database setting signal being used for setting motor specification data in the motor specification database setting mode,
   wherein two of the pins are multi-functional pins for transmitting the clock signal and the motor specification database setting signal in the motor specification database setting mode, and the multi-functional pins are for transmitting other signals in a normal operation mode.

2. The motor controller of claim 1, wherein the plurality of pins include a pin for receiving a speed control signal, pins for receiving motor speed sensing signals, a pin for outputting motor speed information, a pin for connecting to a motor voltage supply, a pin for connecting to ground, and pins for outputting motor driving signals, in the normal operation mode.

3. A motor controller, having a normal operation mode and a motor specification database setting mode, the motor controller comprising:
   a speed transformation unit, including a memory for storing motor specification data, the speed transformation unit receiving a speed control signal through a speed control signal input pin in the normal operation mode, and generating a motor speed command signal according to the motor specification data;
   a control unit, receiving the motor speed command signal and receiving a motor speed sensing signal through a motor speed sensing pin in the normal operation mode, and generating a motor speed control signal according to the motor speed command signal and the motor speed sensing signal, the control unit outputting motor speed information through a motor speed information output pin; and
   a motor driving unit, generating a motor driving signal according to the motor speed control signal to drive a motor through motor driving pins in the normal operation mode;
   wherein at least one of the speed control signal input pin, the motor speed sensing pin, the motor speed information output pin, and the motor driving pins is used for transmitting a clock signal or transmitting a motor specification database setting signal in the motor specification database setting mode.

4. The motor controller of claim 3, wherein at least two of the speed control signal input pin, the motor speed sensing pin, the motor speed information output pin, and the motor driving pins are used for transmitting the clock signal and transmitting the motor specification database setting signal respectively, in motor specification database setting mode.

5. The motor controller of claim 3, further comprising a pin for connecting to a motor voltage supply and a grounding pin for connecting to a ground.

6. A method of controlling a motor controller, comprising:
   entering a motor specification database setting mode, and transmitting a clock signal through a first pin of the motor controller and a motor specification database setting signal through a second pin of the motor controller, for storing a motor specification data in a memory of the motor controller; and entering a normal operation mode, and transmitting a signal which is neither the clock signal nor the motor specification database setting signal through one of the first pin and the second pin of the motor controller.

7. The method of controlling the motor controller of claim 6, wherein after entering the normal operation mode, the first pin and the second pin of the motor controller are both used to transmit signals which are neither the clock signal nor the motor specification database setting signal.

8. The method of controlling the motor controller of claim 6, wherein the motor controller includes a speed control signal input pin, a plurality of motor speed sensing pins, a motor speed information output pin, a plurality of motor driving pins, a pin for connecting to a motor voltage supply, and a grounding pin for connecting to a ground, and two of these pins are the first pin and the second pin, respectively.

9. The method of controlling the motor controller claim 8, further comprising:

inputting a first predefined signal to activate the motor specification database setting mode through one of the speed control signal input pin, the motor speed sensing pins, the motor speed information output pin, the motor driving pins, the pin for connecting to a motor voltage supply , and the grounding pin.

10. The method of controlling the motor controller of claim 9, further comprising:

inputting a second predefined signal through one of the speed control signal input pin, the motor speed sensing pins, the motor speed information output pin, the motor driving pins, the pin for connecting to a motor voltage supply, and the grounding pin, or counting a predetermined period of time, to leave the motor specification database setting mode and enter the normal operation mode.

* * * * *